(12) United States Patent
Lei

(10) Patent No.: US 10,361,572 B2
(45) Date of Patent: Jul. 23, 2019

(54) POWER SUPPLY COMPONENT AND POWER SUPPLY METHOD

(71) Applicant: Shenzhen Carku Technology Co., Ltd., Shenzhen (CN)

(72) Inventor: Yun Lei, Shenzhen (CN)

(73) Assignee: SHENZHEN CARKU TECHNOLOGY CO., LTD., Shenzhen (CN)

( * ) Notice: Subject to any disclaimer, the term of this patent is extended or adjusted under 35 U.S.C. 154(b) by 381 days.

(21) Appl. No.: 15/209,767

(22) Filed: Jul. 14, 2016

(65) Prior Publication Data
US 2017/0373519 A1 Dec. 28, 2017

(30) Foreign Application Priority Data
Jun. 27, 2016 (CN) .......................... 2016 1 0482321

(51) Int. Cl.
*H02J 7/00* (2006.01)
*H02J 7/34* (2006.01)
*H02J 9/00* (2006.01)
*F02N 11/08* (2006.01)

(52) U.S. Cl.
CPC ............ *H02J 7/0054* (2013.01); *H02J 7/007* (2013.01); *H02J 7/345* (2013.01); *H02J 9/002* (2013.01); *F02N 2011/0885* (2013.01); *H02J 2007/0059* (2013.01)

(58) Field of Classification Search
USPC ....................................................... 320/103
See application file for complete search history.

(56) References Cited

U.S. PATENT DOCUMENTS

| | | | | |
|---|---|---|---|---|
| 5,745,276 A * | 4/1998 | Ho | ...................... | H04B 10/6931 250/214 A |
| 6,249,687 B1 * | 6/2001 | Thomsen | ................ | H01P 1/213 375/316 |
| 6,268,711 B1 * | 7/2001 | Bearfield | .............. | H02J 7/0024 320/116 |
| 8,436,580 B2 * | 5/2013 | Tai | ......................... | H02J 7/0024 320/116 |
| 10,116,158 B2 * | 10/2018 | Diederichs | ............ | H02J 7/0063 |
| 2013/0043731 A1 * | 2/2013 | Mullin | .................. | H02J 7/0021 307/80 |
| 2013/0187464 A1 * | 7/2013 | Smith | .................... | H02J 7/0052 307/47 |

(Continued)

*Primary Examiner* — Samuel Berhanu
(74) *Attorney, Agent, or Firm* — Jun He Law Offices P.C.; James J. Zhu

(57) ABSTRACT

The present application relates to a power supply device and a power supply method for providing electric energy to a target system. The power supply device includes: a first controller which is configured to receive an external signal or instruction, and to generate a power supply control signal; and a first option switch which is configured to receive the power supply control signal, and to establish a connection between at least one energy storage module and the target system in order to selectively output electric energy to the target system with one or more predetermined voltage; wherein when the electric energy to be output by the power supply device is a first predetermined voltage, a first energy storage module of the at least one energy storage module is connected with the target system.

17 Claims, 11 Drawing Sheets

(56) References Cited

U.S. PATENT DOCUMENTS

| | | | | |
|---|---|---|---|---|
| 2014/0191585 A1* | 7/2014 | Gulak | ............... | H01F 27/2804 |
| | | | | 307/104 |
| 2015/0280444 A1* | 10/2015 | Smith | ............... | H02J 17/00 |
| | | | | 307/104 |
| 2015/0280486 A1* | 10/2015 | Hsu | ............... | B60L 11/1818 |
| | | | | 320/107 |
| 2015/0311736 A1* | 10/2015 | Park | ............... | H02J 7/0054 |
| | | | | 320/104 |
| 2016/0118845 A1* | 4/2016 | Yeo | ............... | H02J 50/12 |
| | | | | 320/108 |
| 2016/0121735 A1* | 5/2016 | Sugano | ............... | B60L 11/1818 |
| | | | | 320/109 |
| 2016/0181822 A1* | 6/2016 | Yang | ............... | H02J 5/005 |
| | | | | 307/104 |
| 2016/0204654 A1* | 7/2016 | Mondal | ............... | H02J 9/066 |
| | | | | 307/67 |

\* cited by examiner

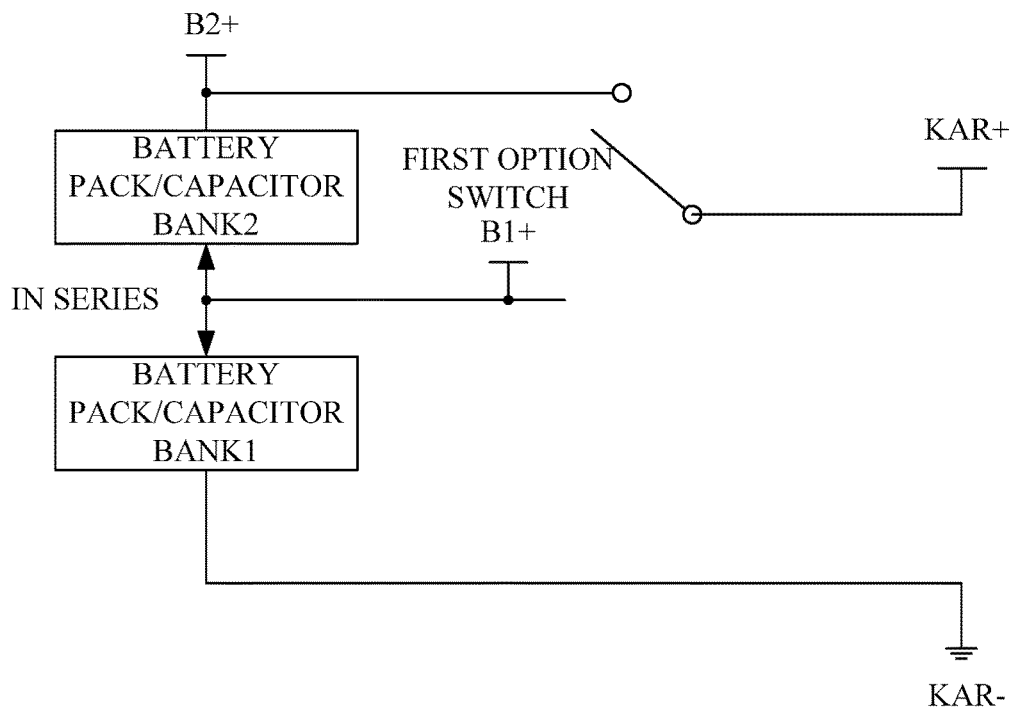
Figure. 1
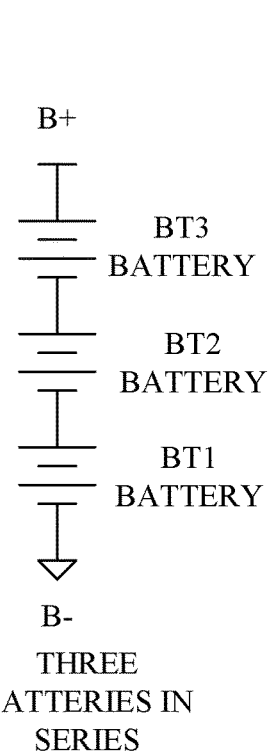 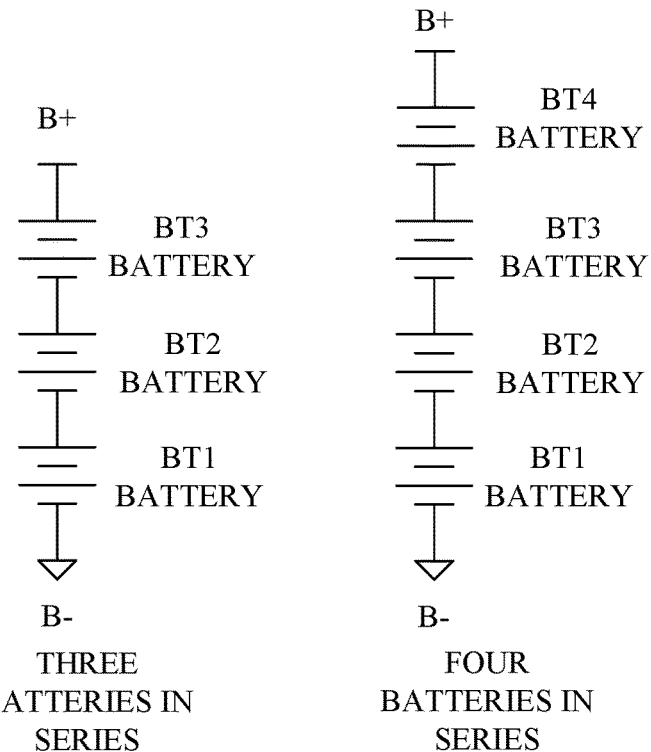 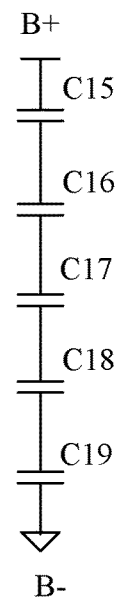
Figure. 2A  Figure. 2B  Figure. 2C

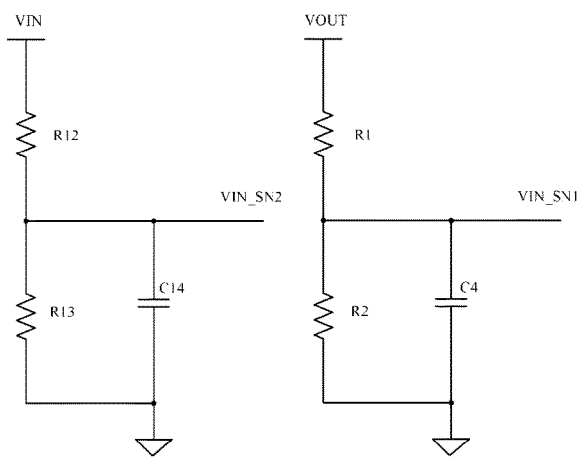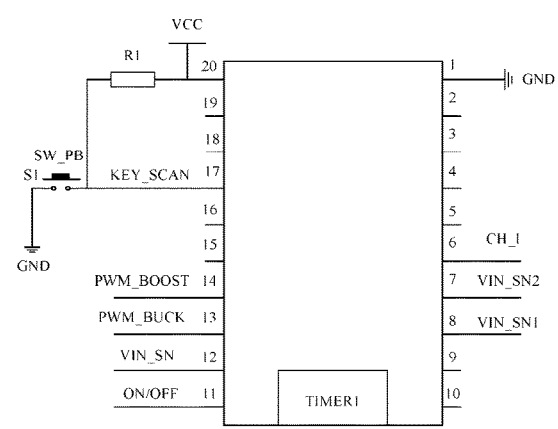
Figure. 13A                               Figure.13B

POWER SUPPLY COMPONENT AND POWER SUPPLY METHOD

CROSS REFERENCE TO RELATED APPLICATIONS

This application claims priority to Chinese Patent Application Number 201610482321.9 filed on Jun. 27, 2016, the entire content of which is incorporated herein by reference.

TECHNICAL FIELD

The present application relates to power supply technology, and more particularly, to a power supply device and a power supply method.

BACKGROUND

Generally, self-embedded power supplies are configured in various vehicles, apparatus, or electronic devices to provide electric energy to various internal components. For example, a storage battery, usually a lead-acid battery, is normally installed in a car to provide electric energy necessary to start the car. Besides, the storage battery can also be used as a low-voltage DC power supply to provide other electronic devices in a car, such as stereo, air conditioner, light, instrumentation, etc. with low-voltage DC power. Usually, after being started, the engine of a car can charge a car battery to ensure sufficient power of the car battery. However, due to reasons such as being shut down for a long time, leaving the key switch open, leaving the lights on after turning off the engine, or malfunction of the low-voltage electric system of the vehicle, the car battery may not have sufficient power to start a car. Therefore, some emergency power supply products are used in cars to provide emergency starting when the car battery is unable to start the car.

However, according to different rating voltage specifications, common automobile storage batteries are divided into 12V and 24V batteries which can respectively start gasoline engines and diesel engines. Storage batteries with different rating voltages require different charging circuits, otherwise excessive voltage will overheat, or even damage, the battery, while insufficient voltage cannot effectively charge the battery. In the prior art, storage batteries with different rating voltage specifications usually adapt to different emergency power supplies, which are incompatible and causes inconvenience and a waste of resources. Besides, under special circumstances, self-embedded power supplies are not installed in vehicles, apparatus, or electronic devices, which raises the need for compatible external emergency power supplies which provide multi-voltage output.

In addition, it is desirable that emergency power supplies might also be charged. It is desirable to provide a solution of charging a multi-voltage output emergency power supply based on the energy storage status of respective energy storage modules.

SUMMARY

At least one purpose of the present application is to provide a power supply device and a power supply method in order to solve at least one problem of the prior art.

The present application relates to a power supply device which can provide electric energy to a target system. The power supply device includes: a first controller which is configured to receive an external signal or instruction, and to generate a power supply control signal based on the external signal or instruction; and a first option switch which is configured to receive the power supply control signal, and to establish an electric connection between at least one energy storage module and the target system based on the power supply control signal in order to selectively output electric energy to the target system with one or more predetermined voltages; wherein when the electric energy needs to be output by the power supply device with a first predetermined voltage, said first option switch is configured to establish an electric connection between a first energy storage module of the at least one energy storage module and the target system.

In some embodiments, when the electric energy needs to be output with other voltages different from said first voltage, said first option switch is configured to connect the first energy storage module with other energy storage modules of the at least one energy storage module in series, and then connect said at least one energy storage module with the target system.

In some embodiments, the at least one energy storage module further includes a second energy storage module. The first option switch is configured to establish an electric connection between the first, the second energy storage modules and the target system based on the power supply control signal in order to selectively output electric energy to the target system with the first predetermined voltage or a second predetermined voltage; wherein when the electric energy needs to be output with the first predetermined voltage, the first option switch is configured to connect only the first energy storage module with the target system, and when the electric energy needs to be output with the second predetermined voltage, the first option switch is configured to connect the first energy storage module with the second energy storage module in series, and then connect said at least one energy storage module with the target system.

In some embodiments, the at least one energy storage module further includes a second energy storage module and a third energy storage module. The first option switch is configured to establish a connection between the first, the second, the third energy storage modules and the target system based on the power supply control signal in order to selectively output electric energy to the target system with the first predetermined voltage, a second predetermined voltage, or a third predetermined voltage; wherein when the electric energy needs to be output with the first predetermined voltage, the first option switch is configured to connect only the first energy storage module with the target system, when the electric energy needs to be output with the second predetermined voltage, the first option switch is configured to connect the first energy storage module with the second energy storage module in series, and then connect said at least one energy storage module with the target system, and when the electric energy needs to be output with the third predetermined voltage, the first option switch is configured to connect the first energy storage module with both the second and the third energy storage modules in series, and then connect said at least one energy storage module with the target system.

In some embodiments, the power supply device further includes an instruction input circuit. The instruction input circuit is configured to output an instruction to the first controller, wherein the first controller is configured to control the first option switch based on the instruction in order to provide the first predetermined voltage output or the second predetermined voltage output.

In some embodiments, the power supply device further includes a voltage detection circuit. The voltage detection circuit is configured to detect a desired charging voltage of the target system and to output a voltage detection signal. The first controller identifies the desired charging voltage of the target system based on the voltage detection signal and controls the first option switch to provide the first predetermined voltage output or the second predetermined voltage output.

In some embodiments, the power supply device further includes a charging circuit, a second controller, and a second option switch, wherein the second controller is configured to generate a charging control signal to be sent to the second option switch; the second option switch is configured to establish an electric connection between the charging circuit and the first or the second energy storage module based on the charging control signal; and the charging circuit is configured to charge the first energy storage module alone or to charge both the first and the second energy storage modules simultaneously based on the connection between the second option switch and the first or the second energy storage module.

In some embodiments, the charging circuit includes a voltage detection circuit, an external charging power supply, and a buck-boost circuit. The voltage detection circuit is used to detect the voltage of the first energy storage module, the second energy storage module, the input terminal of the charging circuit, or the output terminal of the charging circuit. Based on the detection of the voltage detection circuit, the buck-boost circuit is configured to boost the output voltage of the external charging power supply when the charging voltage needs to be raised, and to lower the output voltage of the external charging power supply when the charging voltage needs to be lowered.

In some embodiments, the buck-boost circuit includes a capacitor, a triode, a diode, and an inductance.

In some embodiments, the first or the second energy storage module consists of a plurality of capacitors in series or a plurality of batteries in series.

In some embodiments, the battery is selected from a group consisting of a lithium cobalt oxide battery, a lithium manganate battery, a lithium iron phosphate battery, a lithium titanate battery, a ternary material lithium-ion battery, or a lead-acid battery.

In some embodiments, the capacitor is selected from a group consisting of a supercapacitor, a lithium-ion capacitor, a hybrid capacitor, or a farad capacitor.

In some embodiments, the first energy storage module consists of four 3.7V/3.8V batteries in series, and the second energy storage module consists of three 3.7V/3.8V batteries in series.

In some embodiments, the first energy storage module consists of three 3.7V/3.8V batteries in series, and the second energy storage module consists of three 3.7V/3.8V batteries in series.

In some embodiments, the first energy storage module consists of four 3.2V batteries in series, and the second energy storage module consists of four 3.2V batteries in series.

In some embodiments, the first energy storage module consists of four 3.7V/3.8V batteries in series, and the second energy storage module consists of four 3.7V/3.8V batteries in series.

In some embodiments, the first energy storage module consists of five or six 2.4V lithium titanate batteries in series, and the second energy storage module consists of five or six 2.4V lithium titanate batteries in series.

In some embodiments, the first energy storage module consists of three to five capacitors in series, and the second energy storage module consists of three to five capacitors in series.

In some embodiments, the power supply device is a portable power supply device.

In some embodiments, the target system is a car system.

The present application also relates to a power supply method for providing electric energy to a target system. The power supply method includes: by a first controller, receiving an external signal or instruction and generating a power supple control signal based on the external signal or instruction; and by a first option switch, receiving the power supple control signal and establishing a connection between at least one energy storage module and the target system based on the power supple control signal in order to selectively output electric energy to the target system with one or more predetermined voltages; wherein when the electric energy needs to be output with a first predetermined voltage, connecting a first energy storage module of the at least one energy storage module with the target system.

In some embodiments, the power supply method further includes: by the first option switch, establishing a connection between a first, a second energy storage modules and the target system based on the power supply control signal in order to selectively output electric energy to the target system with a first predetermined voltage or a second predetermined voltage; wherein when the electric energy needs to be output with the first predetermined voltage, by the first option switch, connecting only the first energy storage module with the target system, and when the electric energy needs to be output with the second predetermined voltage, by the first option switch, connecting the first energy storage module with the second energy storage module in series, and then connecting said at least one energy storage module with the target system.

In some embodiments, the power supply method further includes: by a second controller, generating a charging control signal to be sent to a second option switch; by the second option switch, selectively establishing an electric connection between an charging circuit and the first or the second energy storage module based on the charging control signal; and by the charging circuit, charging the first energy storage module alone or charging both the first and the second energy storage module simultaneously based on the connection between the second option switch and the first or the second energy storage module.

Following technical effects can be acquired from the technical scheme provided by the present application: first, the voltage of the target system can be automatically detected and option switches can be automatically controlled to output electric energy with different output voltages; second, the voltage of energy storage modules can be automatically detected in order to selectively boost or buck the voltage of the external charging power supply based on different requirements; third, the energy storage module that needs to be charged can be automatically selected based on the different requirements.

The foregoing is a summary of the present application where simplification, generalization, and omitted details may exist. Therefore, it should be appreciated by those skilled in the art that this section of the present application is not intended to limit the scope of the present application by any means, but rather for exemplary illustration only. This summary section of the present application is not intended to identify any key or essential feature of the claimed subject matter, and is not intended to be used as a supplementary means to identify the scope of the claimed subject matter.

BRIEF DESCRIPTION OF THE DRAWINGS

The aforementioned features and other features of the present application will be fully understood by reading the following description by referring to the accompanying drawings and the appended claims. It will be understood that, these accompanying drawings merely illustrate certain embodiments in accordance with the present application and should not be considered as limitation to the scope of the present application. The present application will be described with more clarity and in more detail by referring to the accompanying drawings.

FIG. 1 is a diagram illustrating a power supply device according to an exemplary embodiment of the present application.

FIG. 2A-2C are circuit diagrams illustrating an energy storage module according to an exemplary embodiment of the present application.

FIG. 13A-13B are circuit diagrams illustrating the circuits of VIN terminal, VOUT terminal of FIG. 12, and the circuit of a second controller.

DETAILED DESCRIPTION

Figure 3:
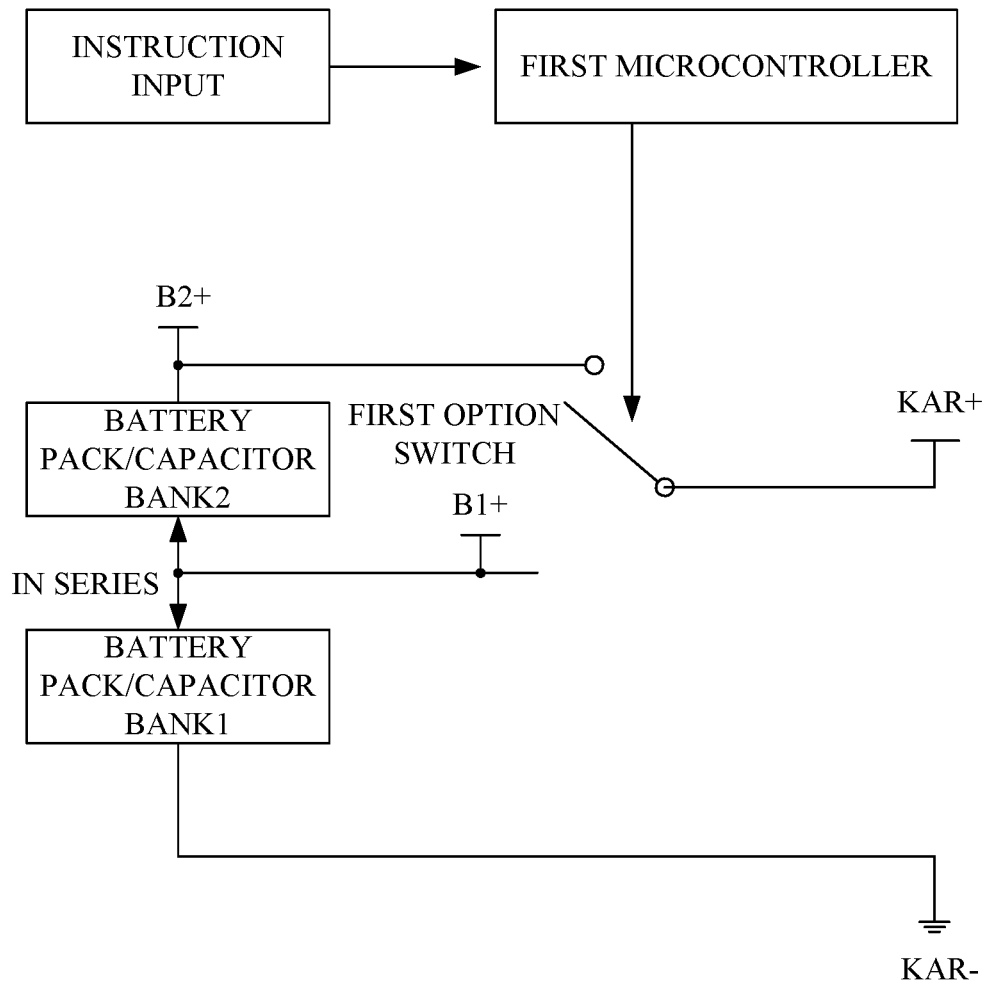
FIG. 3 is a diagram illustrating a power supply device with an input instruction according to an exemplary embodiment of the present application.

The following detailed description refers to the accompanying drawings which is a part of the present application. Unless otherwise specified in the context, similar symbols usually represent similar components in accompanying drawings. The illustrative embodiments described in the detailed description, the accompanying drawings and the claims are not limiting, and other embodiments may be adopted, or modifications may be made without deviating from the spirit and subject of the present application. It should be understood that the various aspects of the present application described and graphically presented herein may be arranged, replaced, combined, divided and designed in many different configurations, and these different configurations are implicitly comprised in the present application.

It should also be understood that the terms and phrases used herein are for the purpose of illustration and should not be considered to be limiting. "Include" and "contain" used herein, as well as variations hereof, are intended to contain the items enumerated thereafter, as well as equivalents hereof and additional items. "Comprised with" used herein and variations hereof are intended to only contain the items enumerated thereafter, as well as equivalents hereof. Unless otherwise specified or limited, terms of "couple", "connect", "link", and variations hereof are used in a broad sense, and cover direct or indirect coupling, connection, and link.

FIG. 1 is a diagram illustrating a power supply device according to an exemplary embodiment of the present application. The power supply device includes a first energy storage module (i.e. battery pack/capacitor bank 1 of FIG. 1, hereinafter), a second energy storage module (i.e. battery pack/capacitor bank 2 of FIG. 1, hereinafter), a first option switch, and a first controller (not shown in FIG. 1).

The embodiment illustrated in FIG. 1 includes two energy storage modules. Correspondingly, the first controller (i.e. the first microcontroller of FIG. 1, hereinafter) is configured to receive an external signal or instruction and to generate a power supply control signal based on the external signal or instruction; the first option switch is configured to be operably connected with the first or the second energy storage module, to receive the power supply control signal, and to change the connection between a first, a second energy storage modules and the target system based on the power supple control signal in order to output electric energy with a first or a second voltage; the first energy storage module is connected with the second energy storage module in series, and is selectively connected with the target system through the first option switch; when the electric energy needs to be output with the first voltage, only the first energy storage module is connected with the target system, when the electric energy needs to be output with the second voltage, e.g., said second voltage being higher than the first voltage, the first energy storage module is connected with the target system after being connected with the second energy storage module in series.

However, it should be noted that the present application neither limits the quantity of the energy storage modules to two, nor limits the output voltages to the first and the second voltage. That is, according to the technical scheme of the present application, the first option switch may establish a connection between at least one energy storage module and the target system based on the power supply control signal in order to selectively output electric energy to the target system with one or more predetermined voltage; wherein the at least one energy storage module is selectively connected with the target system through the first option switch, and when the electric energy needs to be output with a first voltage, the first energy storage module of the at least one energy storage module is individually connected with the target system. In some embodiments, when the electric energy needs to be output with other specific voltages, the first energy storage module is connected with the target system after being connected with other additional energy storage modules of the at least one energy storage module in series.

In particular, in some embodiments, the at least one energy storage module includes the first energy storage module and the second energy storage module. The first option switch is configured to change the connection between the first, the second energy storage modules and the target system based on the power supply control signal in order to selectively output electric energy to the target system with the first voltage or the second voltage; wherein when the electric energy needs to be output with the first voltage, the first energy storage module is individually connected with the target system, and when the electric energy needs to be output with the second voltage, the first energy storage module is connected with the target system after being connected with the second energy storage module in series.

Alternatively, in some other embodiments, the at least one energy storage module includes the first energy storage module, the second energy storage module, and a third energy storage module. The first option switch is configured to change the connection between the first, the second, the third energy storage modules and the target system based on the power supply control signal in order to selectively output electric energy to the target system with the first voltage, the second voltage, or a third voltage; wherein when the electric energy needs to be output with the first voltage, the first energy storage module is individually connected with the target system. When the electric energy needs to be output with the second voltage, the first energy storage module is connected with the target system after being connected with the second energy storage module in series. When the electric energy needs to be output with the third voltage, the first energy storage module is connected with the target system after being connected with both the second and the third energy storage module in series.

In conclusion, the present application may include multiple energy storage modules and may select one or several specific energy storage modules in series thereof to output electric energy to the target system at more than one desired output voltage.

Hereinafter, for simplicity, the example of two energy storage modules will be used as an illustration wherein the first voltage is 12V and the second voltage is 24V.

As shown in FIG. 1, the positive electrode of the self-embedded power supply is KAR+, and the negative electrode of the self-embedded power supply is KAR−. When the 12V car engine needs to be started, the option switch connects B1+ with KAR+. When the 24V car engine needs to be started, the option switch connects B2+ with KAR+. The negative electrode of the first energy storage module is connected with the negative electrode of the self-embedded power supply KAR− all the time.

The option switch can be a manual switch or be implemented by non-synchronous breakover of two controllable switches such as relays, MOS tubes, or IGBT, etc.

In practical applications, the power supply device can be used to start engines of various types of cars in emergency, such as to start the engine of a car, a motorcycle, a tricycle, or other motor vehicles in emergency. Therefore, the starting charging voltage includes but not limits to 12V or 24V.

FIG. 2A-2C are circuit diagrams illustrating an energy storage module according to an exemplary embodiment of the present application. Every energy storage module is comprised with a battery pack or a capacitor bank.

As shown in FIG. 2A-2C, a battery pack is comprised with multiple batteries in series, and a capacitor bank is comprised with multiple capacitors in series. For example, in situations where the output voltage is 12V or 24V selectively, the energy storage module 1 can be comprised with four 3.7V/3.8V batteries in series and the energy storage module 2 can be comprised with three 3.7V/3.8V batteries in series; or the energy storage module 1 can be comprised with three 3.7V/3.8V batteries in series and the energy storage module 2 can be comprised with three 3.7V/3.8V batteries in series; or the energy storage module 1 can be comprised with four 3.2V batteries in series and the energy storage module 2 can be comprised with four 3.2V batteries in series; or the energy storage module 1 can be comprised with four 3.7V/3.8V batteries in series and the energy storage module 2 can be comprised with four 3.7V/3.8V batteries in series; or the energy storage module 1 can be comprised with five or six 2.4V lithium titanate batteries in series and the energy storage module 2 can be comprised with five or six 2.4V lithium titanate batteries in series; or the energy storage module 1 can be comprised with three to five capacitors in series and the energy storage module 2 can be comprised with three to five capacitors in series. The above connections between batteries and batteries, or between capacitors and capacitors are serial connections.

In practical applications, a 3.7V/3.8V battery includes a ternary battery and a lithium cobalt oxide battery. A 3.2V battery includes a lithium iron battery. A capacitor includes a supercapacitor, a farad capacitor, a hybrid capacitor, and a lithium-ion (LIC) capacitor. A 12V energy storage module is typically comprised with three 3.7V lithium cobalt oxide batteries in series, or a 12V energy storage module can be comprised with four 3.2V lithium iron batteries in series.

It should be noted that, in practical applications, 12V voltage is a general reference, and 10.5V-14.4V all belong to nominal 12V voltage. Generally, there is almost no electric energy left when a 12V lead-acid battery is discharged to 10.5V, and continued discharging will damage the service life of a battery. When the charging voltage is over 14.4V, a battery starts to separate out hydrogen and oxygen, and separating out hydrogen and oxygen for a long time will scrap a battery. However, sometimes, in order to raise charging speed, charging voltage can be raised to 16V for a short period of time. In the present application, the permissible voltage of the energy storage module comprised with lithium batteries ranges from 10.8V-16V. The maximum battery voltage of the energy storage module in the present application is around 16V. When an engine is started, the maximum voltage of the energy storage module is 16V, meanwhile the self-embedded power supply is under 14.4V. Therefore, a lead-acid battery which is used as the self-embedded power supply will not be damaged under this circumstance.

FIG. 3 is a diagram illustrating a power supply component with an input instruction according to an exemplary embodiment of the present application. A first controller and an instruction input circuit are added in FIG. 3 on the basis of FIG. 1. The 12V and 24V voltage output are implemented through the control of the instruction input circuit. In practical applications, a button/key might be used to input instruction.

Figure 4:
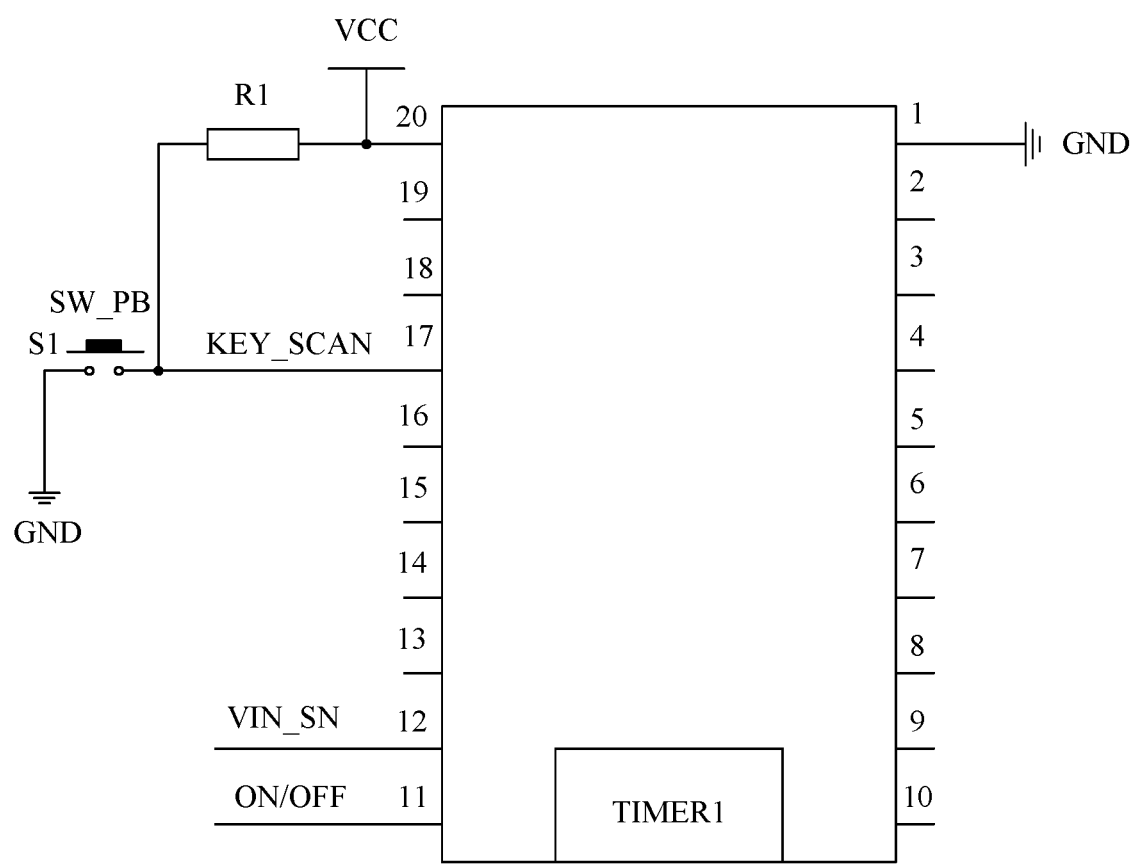
FIG. 4 is a circuit diagram illustrating the first controller of FIG. 3 with the input instruction.

FIG. 4 is a circuit diagram illustrating the first controller of FIG. 3 with the input instruction. As shown in FIG. 4, the instruction input circuit includes a key S1 and a pull-up resistor R1. When the key S1 is not pressed, the signal output to the first controller is high level; when the key S1 is pressed, the signal output to the first controller is low level. The first controller determines whether a key is pressed, e.g., whether an instruction is input, through the level fluctuation in order to output the power supply control signal based on the instruction to control the first option switch. Accordingly, the first option switch is used to change the connection between the first, the second energy storage modules and the target system to output electric energy with different output voltages.

Figure 5:
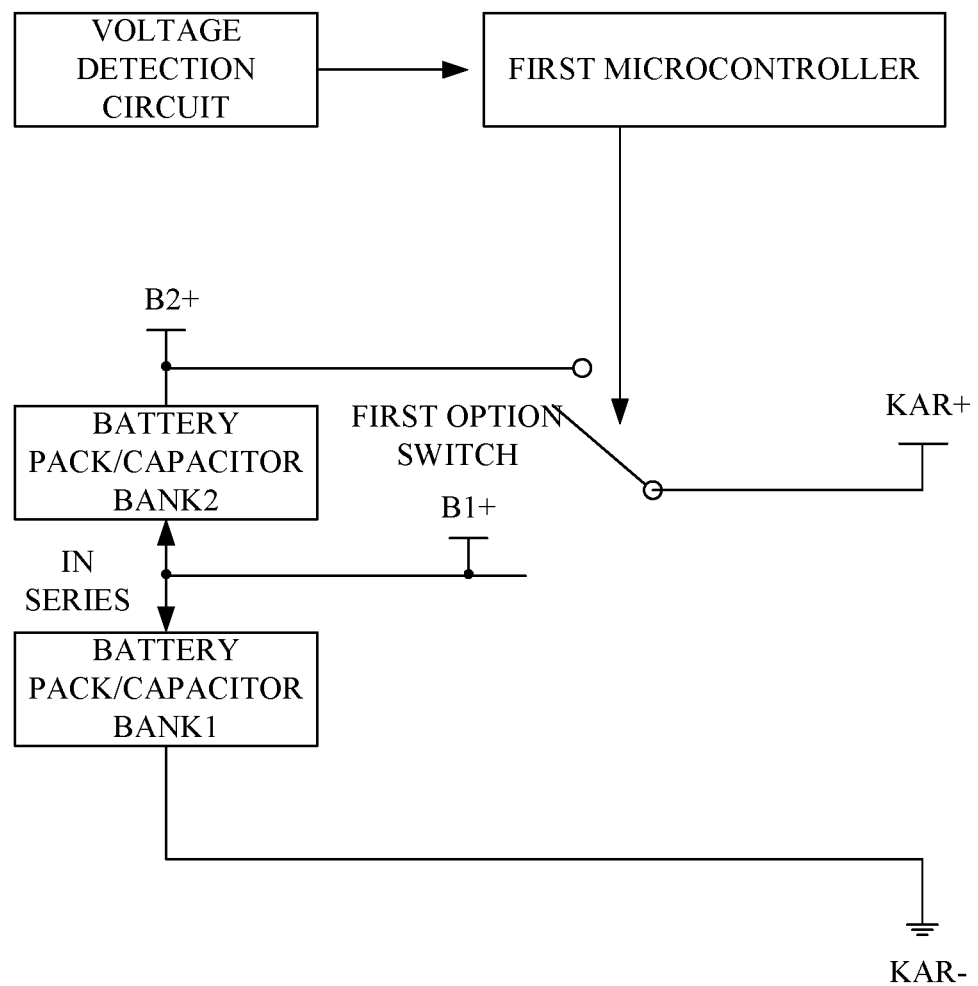
FIG. 5 is a diagram illustrating a power supply device with a voltage detection circuit according to an exemplary embodiment of the present application.

FIG. 5 is a diagram illustrating a power supply component with a voltage detection circuit according to an exemplary embodiment of the present application. As shown in FIG. 5, a first controller and a self-embedded power supply voltage detection circuit are added in FIG. 5 on the basis of FIG. 1. The voltage detection circuit is used to detect the voltage of the self-embedded power supply and to output a voltage detection signal. The first controller identifies the voltage of the self-embedded power supply based on the voltage detection signal and output the power supply control signal therefrom in order to control the first option switch to change the connection between the first, the second energy storage modules and the target system to output electric energy with different output voltages.

Figure 6:
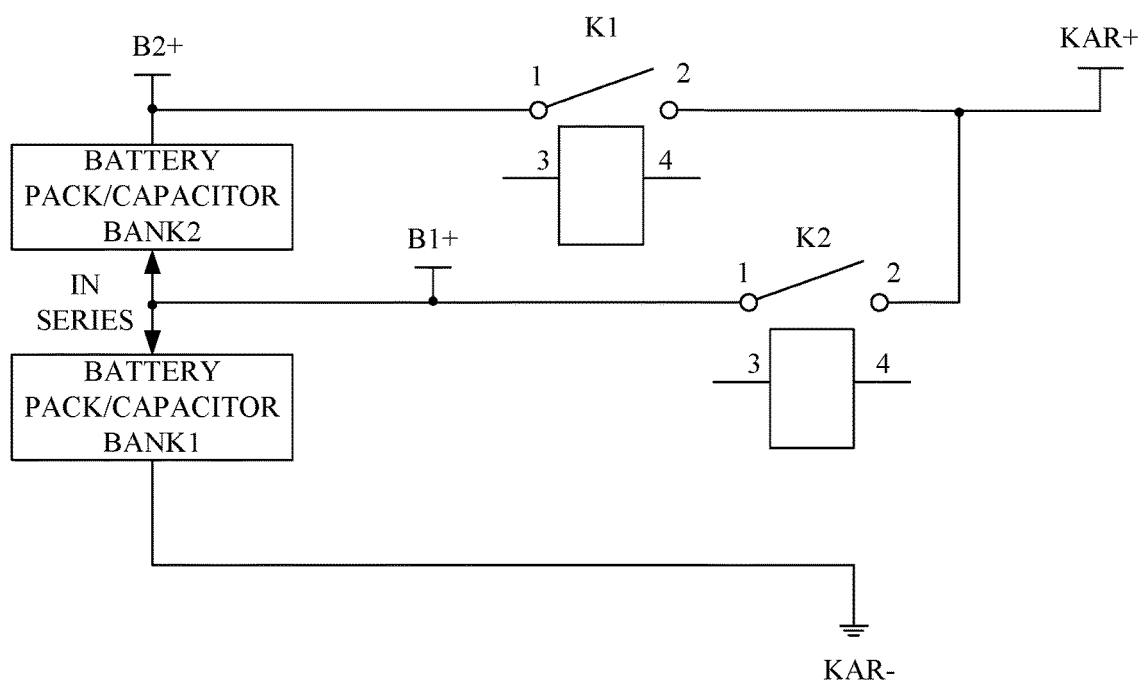
FIG. 6 is a diagram illustrating a power supply device with a relay working as a first option switch according to an exemplary embodiment of the present application.

FIG. 6 is a diagram illustrating a power supply component with a relay working as a first option switch according to an exemplary embodiment of the present application. As shown in FIG. 6, a first controller (not shown in FIG. 6) is configured to receive an external signal or instruction and to generate a power supply control signal based on the external signal or instruction. When a second voltage needs to be output, the power supply control signal controls K1 to close in order to output electric energy with the second voltage; when a first voltage needs to be output, the power supply control signal controls K2 to close in order to output electric energy with the first voltage.

Figure 7:
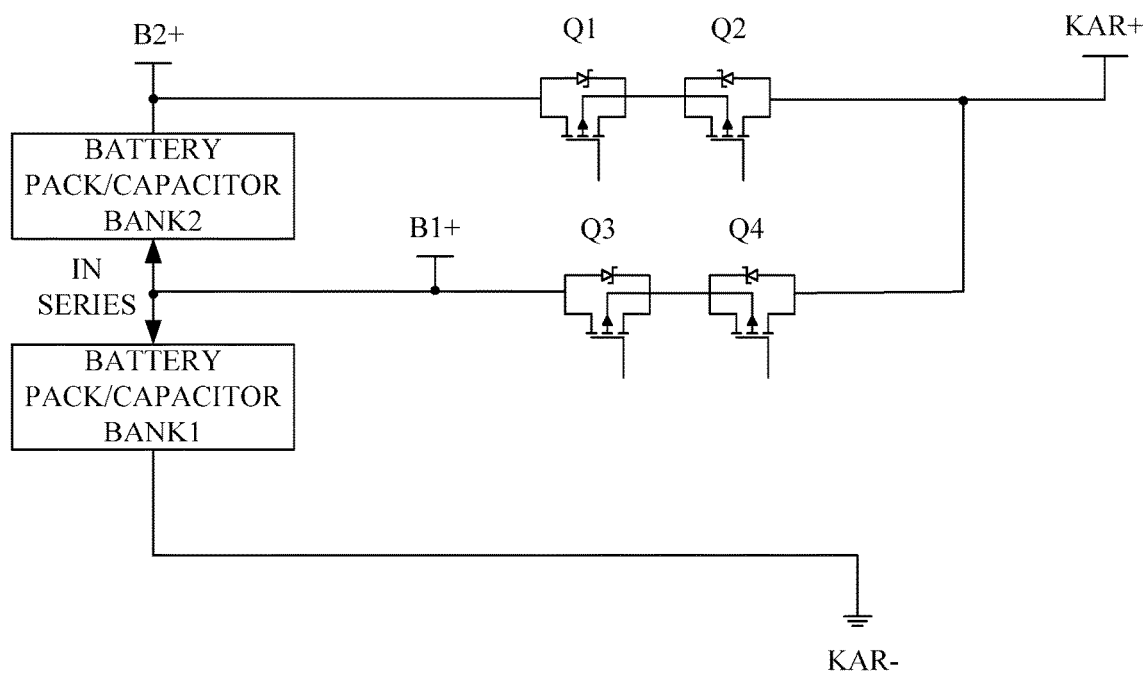
FIG. 7 is a diagram illustrating a power supply device with a MOS tube working as a first option switch according to an exemplary embodiment of the present application.

FIG. 7 is a diagram illustrating a power supply component with a MOS tube working as a first option switch according to an exemplary embodiment of the present application. As shown in FIG. 7, a first controller (not shown in FIG. 7) is configured to receive an external signal or instruction and to generate a power supply control signal based on the external signal or instruction. When a second voltage needs to be output, the power supply control signal controls Q1 to be on, Q2 to be on, Q3 to be off, and Q4 to be off in order to output electric energy with the second voltage; when a first voltage needs to be output, the power supply control signal controls Q3 to be on, Q4 to be on, Q1 to be off, and Q2 to be off in order to output electric energy with the first voltage.

Figure 8:
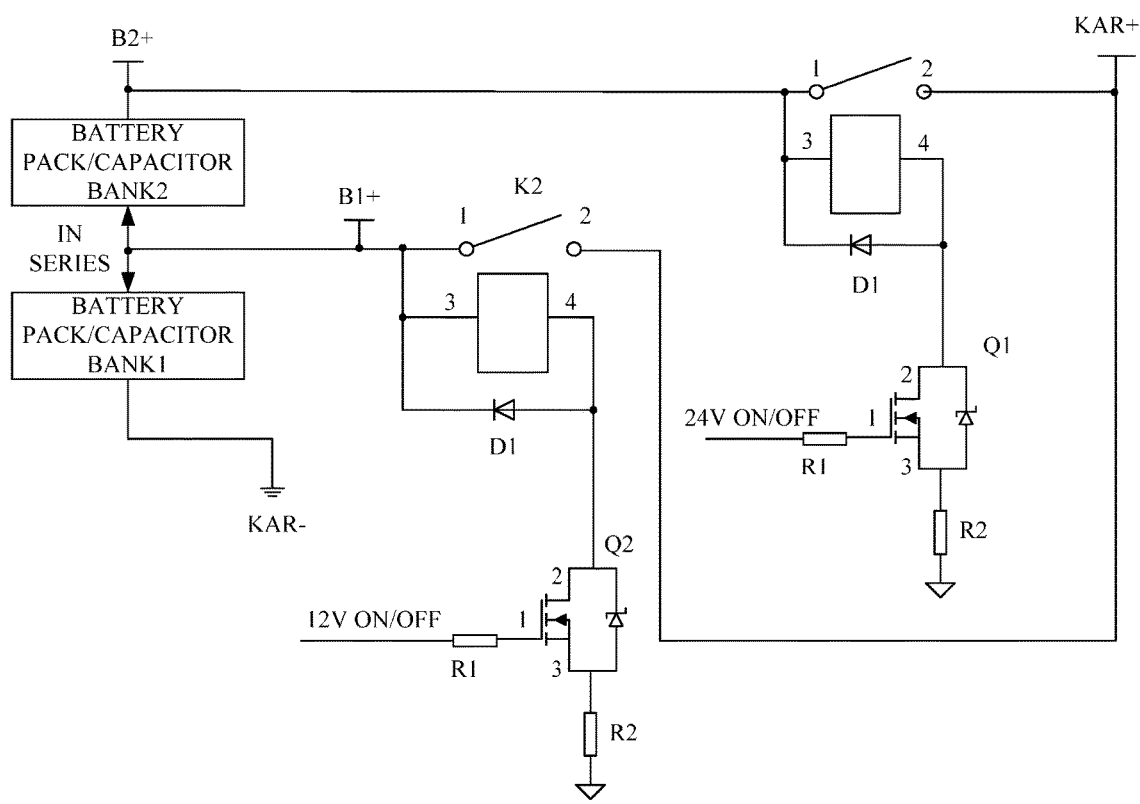
FIG. 8 is a diagram illustrating a power supply device with a relay working as a first option switch according to another exemplary embodiment of the present application.

FIG. 8 is a diagram illustrating a power supply component with a relay working as a first option switch according to another exemplary embodiment of the present application. As shown in FIG. 8, a first controller (not shown in FIG. 8) is configured to receive an external signal or instruction and to generate a power supply control signal based on the external signal or instruction. For example, where the output voltage is 12V or 24V: when 24V_ON/OFF is high level, K1 is closed and the 24V engine is started with the output voltage of 24V; when 12V_ON/OFF is high level, K2 is closed and the 12V engine is started with the output voltage of 12V.

Figure 9:
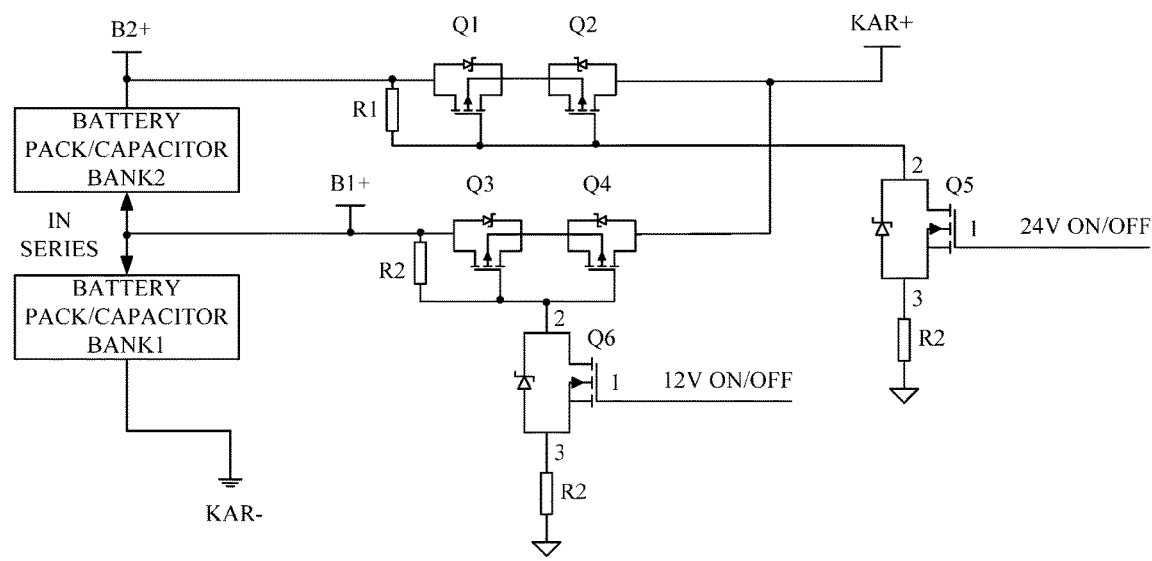
FIG. 9 is a diagram illustrating a power supply device with a MOS tube working as a first option switch according to another exemplary embodiment of the present application.

FIG. 9 is a diagram illustrating a power supply device with a MOS tube working as a first option switch according to another exemplary embodiment of the present application. As shown in FIG. 9, a first controller (not shown in FIG. 9) is configured to receive an external signal or instruction and to generate a power supply control signal based on the external signal or instruction. For example, where the output voltage is 12V or 24V: Q1, Q2, Q3, and Q4 are PMOS, while Q5 and Q6 are NMOS. When 24V_ON/OFF is high level, Q5, Q1, and Q2 are on; when 24V_ON/OFF is low level, Q5, Q1, and Q2 are off. When 12V_ON/OFF is high level, Q6, Q3, and Q4 are on; when 12V_ON/OFF is low level, Q6, Q3, and Q4 are off.

Figure 10:
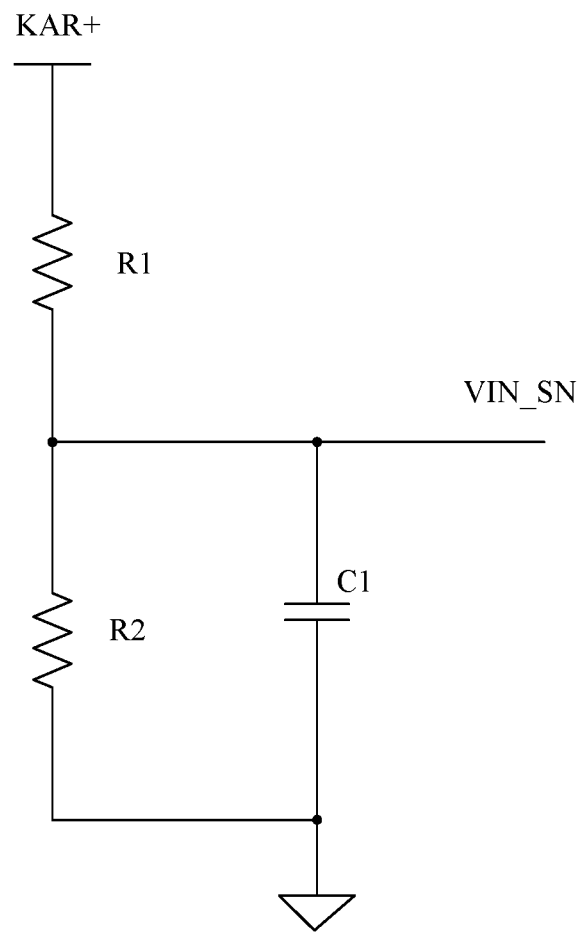
FIG. 10 is a circuit diagram illustrating a voltage detection circuit according to an exemplary embodiment of the present application.

FIG. 10 is a circuit diagram illustrating a voltage detection circuit according to an exemplary embodiment of the present application. As shown in FIG. 10, the voltage detection circuit includes a resistor R1, a resistor R2, and a capacitor C1, wherein voltage division is formed by R1 and R2. The positive electrode of the self-embedded power supply KAR+ is connected with one end of the voltage detection circuit in order to detect the voltage of the self-embedded power supply. The voltage detection circuit output a voltage detection signal through VIN_SN which is connected with the ADC within the first controller. The first controller acquires the voltage from the self-embedded power supply through reading the voltage of VIN_SN.

Figure 11:
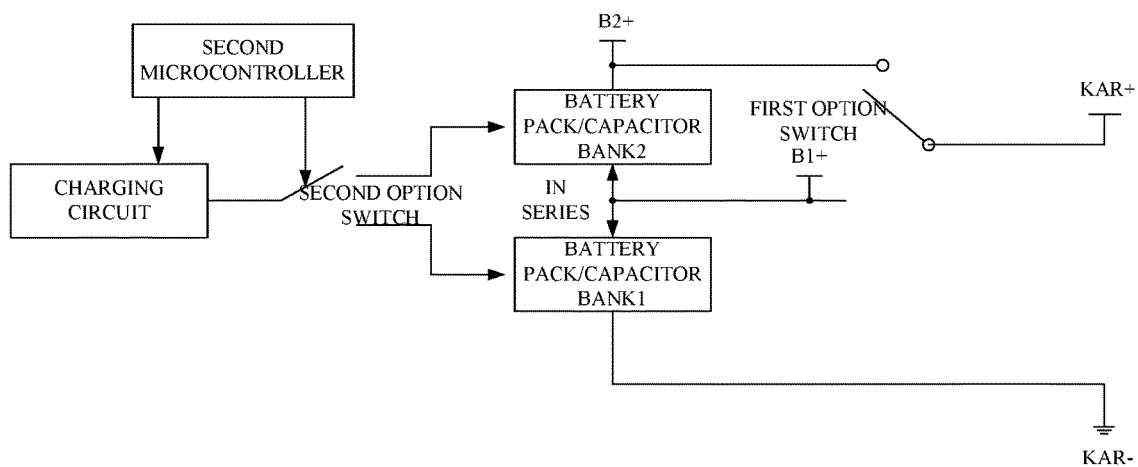
FIG. 11 is a diagram illustrating a power supply device according to another exemplary embodiment of the present application.

FIG. 11 is a diagram illustrating a power supply device according to another exemplary embodiment of the present application. As shown in FIG. 11, the power supply device further comprises a charging circuit, a second controller, and a second option switch. The charging circuit, e.g., an external charging source or the self-embedded power supply, charges the first energy storage module or charges the first and the second energy storage module through the selective connection between the second option switch and the first or the second energy storage module. The second controller generates a charging control signal which is used to control the second option switch; the second option switch is configured to operably connect with the first energy storage module or the second energy storage module, to receive the charging control signal, and to change the connection between the charging circuit and the first or the second energy storage module based on the charging control signal.

Figure 12:
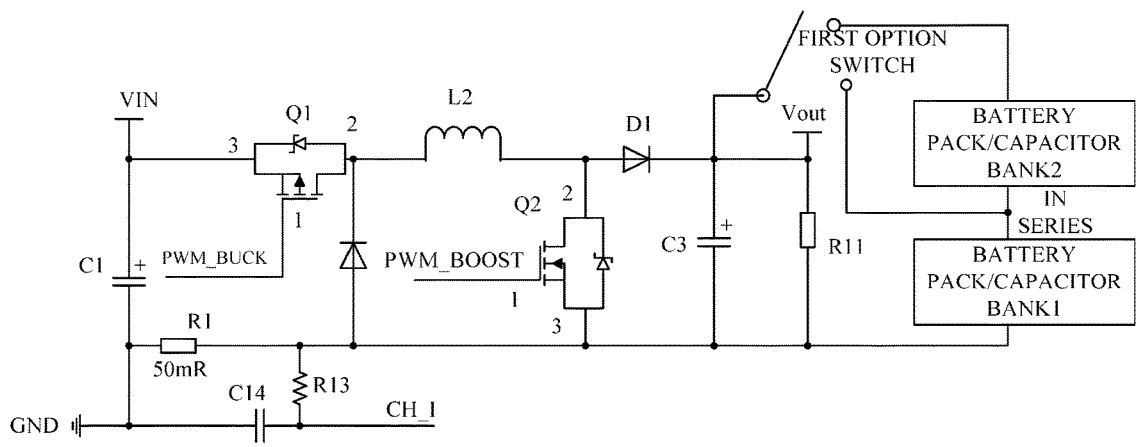
FIG. 12 is a circuit diagram illustrating a charging circuit according to an exemplary embodiment of the present application.

FIG. 12 is a circuit diagram illustrating a charging circuit according to an exemplary embodiment of the present application. As shown in FIG. 12, the charging circuit includes a voltage detection circuit, an external charging power supply, and a buck-boost circuit. In alternative embodiments, the charging circuit is coupled to an external charging power supply. VIN is the positive electrode of the external charging power supply and GND is the grounding terminal. The buck-boost circuit includes a capacitor C1, a triode Q1, a diode D1, an inductance L2, a triode Q2, and a capacitor C3. A current detection circuit is formed by R1, R13, and C14.

Voltage detection circuits (not shown in FIG. 12) are respectively configured in the first energy storage module, the second energy storage module, VIN terminal, and VOUT terminal to detect the voltage status of the energy storage modules and the input, output terminals of the charging circuit. VIN is the input terminal of the charging circuit, and VOUT is the output terminal of the charging circuit. When the voltage detection circuit detects that the voltage of the VIN terminal is higher than the voltage of the VOUT terminal, the buck-boost circuit is required to lower the high voltage of the VIN terminal in order to charge the first or the second energy storage module of the VOUT terminal. Similarly, when the voltage detection circuit detects that the voltage of the VIN terminal is lower than the voltage of the VOUT terminal, the buck-boost circuit is required to raise the low voltage of the VIN terminal in order to charge the first or the second energy storage module of the VOUT terminal.

In one embodiment, Pulse Width Modulation (PWM) generator is the important component to implement buck-boost. The PWM signal output by the PWM generator has high level and low level within one period and the ratio between high level period and the whole period is defined as duty cycle. When the PWM signal is in high level period, the switch tube is on, the diode is off, and the inductance of the buck-boost circuit is charged to store energy. When the PWM signal is in low level period, the switch tube is off, the diode is on, and the inductance releases energy. Suppose that the induced electromotive force generated by the inductance is VL, then Vout=Vin+VL, wherein VL is relevant to Vin and duty cycle. PWM BUCK controls lowering voltage. The higher the duty cycle is, the higher the buck ratio is. PWM BOOST controls raising voltage. The higher the duty cycle is, the higher the boost ratio is. Therefore, through adjusting PWM BUCK signal and PWM_BOOST signal, the input voltage of the VIN terminal can be adjusted to the voltage of the VOUT terminal which is suitable for charging the energy storage module. Detailed operation steps are as follows: when the charging voltage needs to be lowered, the second controller controls the duty cycle of PWM BOOST to be 0, Q2 is off, and the duty cycle of PWM BUCK is adjusted at the same time in order to lower the voltage; when the charging voltage needs to be raised, the second controller controls the duty cycle of PWM BUCK to be 0, Q1 is off, and the duty cycle of PWM BOOST is adjusted at the same time in order to raise the voltage.

The second option switch is configured to operably connect with either the first energy storage module or the second energy storage module, to receive the charging control signal, and to establish a connection between the charging circuit and the first or the second energy storage module based on the charging control signal. When the voltage detection circuit detects that the first energy storage module needs to be charged, the second controller controls the second option switch to connect the charging circuit with the first energy storage module individually; when the voltage detection circuit detects that the second energy storage module needs to be charged, the second controller controls the second option switch to connect the charging circuit with both the first energy storage module and the second energy storage module in series. In one embodiment, the second option switch initially selects to connect the charging circuit with the first energy storage module only, and then, after the charging to the first energy storage module is completed, selects to connect the charging circuit with both the first energy storage module and the second energy storage module in series.

As stated above, although the example of two energy storage modules has been used as an illustration in the present application, more than two energy storage modules can be applied in practical applications. Correspondingly, the charging circuit can be slightly adjusted to charge the more than two energy storage modules respectively. Repeat is not necessary herein.

FIG. 13A-13B are circuit diagrams illustrating the voltage detection circuits of VIN terminal, VOUT terminal of FIG. 12, and the circuit of a second controller.

As shown in FIG. 13A-13B, the voltage of VIN terminal is divided through the voltage detection circuit comprised with a resistor R13, a resistor R12, and a capacitor C14, and the voltage of VIN terminal is detected by the second controller through VIN_SN2 terminal; the voltage of VOUT terminal is divided through the voltage detection circuit comprised with a resistor R1, a resistor R2, and a capacitor C4, and the voltage of VOUT terminal is detected by the second controller through VIN_SN1 terminal, that is the voltage of the energy storage module being charged. R1 of the second controller is used as a charging current testing element.

In some embodiments, the first and the second controllers might be implemented as one same controller.

The present application also provides a power supply method for providing electric energy to a target system, and the target system typically includes a self-embedded power supply, wherein the power supply method includes: providing a first controller which is configured to receive an external signal or instruction, and to generate a power supply control signal based on the external signal or instruction; and providing a first option switch which is configured to receive the power supply control signal, and to change the connection between at least one energy storage module and the self-embedded power supply based on the power supply control signal in order to selectively output electric energy to the target system with a predetermined voltage. Wherein the at least one energy storage module is selectively connected with the self-embedded power supply through the first option switch, and when the electric energy needs to be output with a first voltage, a first energy storage module of the at least one energy storage module is individually connected with the self-embedded power supply.

It should also be appreciated by those skilled in the art that electronic hardware, software, or the combination of both can be implemented by referring to various exemplary methods, steps, and units described by various embodiments disclosed by the present application. In order to clearly represent the interchangeability between hardware and software, various exemplary steps and units above are generally described according to functions thereof. Whether certain function is implemented as hardware or software depends on specific application and design constraints applied on the whole system. The described functions may be implemented by those skilled in the art with variations towards every specific application, however, this strategy of implementation should not be interpreted to cause any deviation from the scope of the present application.

"Example/exemplary" used in the specification of the present application represents using as an example, an illustration, or an explanation. Any "exemplary" technical scheme described in the specification should not be interpreted to be more optimal or to have more advantages than other technical schemes.

It should be noted that, although several modules or sub-modules of the starting power supply and the car starting power supply have been described in the previous paragraphs, such division is exemplary and not mandatory. Practically, according to the embodiments of the present application, the functions and features of two or more modules described above may be embodied in one module. Conversely, the function and feature of any one module described above may be embodied in two or more modules.

The present application provides the above description of the disclosed technical content to enable those skilled in the art to implement or apply the present application. Modifications and variations of these technical content are apparent to those skilled in the art, and general principles defined in the present application can also be applied to other embodiments without departing from the spirit and scope of the present application. Therefore, the present application is not limited to the specific embodiments shown above, but should comply with the broadest range of the inventive concepts disclosed in the present application.

Other variations to the disclosed embodiments can be understood and effected by those skilled in the art in practicing the claimed invention, from a study of the drawings, the application, and the appended claims. In the claims, the word "comprising" does not exclude other elements or steps, and the indefinite article "a" or "an" does not exclude a plurality. In practical applications of the present applica-

What is claimed is:

1. A power supply device for providing electric energy to a target system, wherein the power supply device comprises:
   a first controller which is configured to receive an external signal or instruction, and to generate a power supply control signal based on the external signal or instruction; and
   a first option switch which is configured to receive the power supply control signal, and to establish an electric connection between at least one energy storage module and the target system based on the power supply control signal in order to selectively output electric energy to the target system with one or more predetermined voltages;
   wherein when the electric energy needs to be output by the power supply device with a first predetermined voltage, said first option switch is configured to establish an electric connection between a first energy storage module of the at least one energy storage module with the target system;
   wherein the at least one energy storage module further comprises a second energy storage module, and the first option switch is configured to establish an electric connection between the first, the second energy storage modules and the target system based on the power supply control signal in order to selectively output electric energy to the target system with the first predetermined voltage or a second predetermined voltage;
   wherein when the electric energy needs to be output with the first predetermined voltage, the first option switch is configured to connect only the first energy storage module with the target system, and
   when the electric energy needs to be output with the second predetermined voltage, the first option switch is configured to connect the first energy storage module with the second energy storage module in series, and then connect said at least one energy storage module with the target system;
   wherein the power supply device further comprises a voltage detection circuit, the voltage detection circuit is configured to detect a desired charging voltage of the target system and to output a voltage detection signal, and the first controller identifies the desired charging voltage of the target system based on the voltage detection signal and controls the first option switch to provide the first predetermined voltage output or the second predetermined voltage output.

2. The power supply device according to claim 1, wherein when the electric energy needs to be output with other voltages different from said first voltage, said first option switch is configured to connect the first energy storage module with other energy storage module of the at least one energy storage module in series, and then connect said at least one energy storage module with the target system.

3. The power supply device according to claim 1, wherein the at least one energy storage module further comprises a second energy storage module, and a third energy storage module, and
   the first option switch is configured to establish a connection between the first, the second, the third energy storage modules and the target system based on the power supply control signal in order to selectively output electric energy to the target system with the first predetermined voltage, a second predetermined voltage, or a third predetermined voltage;
   wherein when the electric energy needs to be output with the first predetermined voltage, the first option switch is configured to connect only the first energy storage module with the target system,
   when the electric energy needs to be output with the second predetermined voltage, the first option switch is configured to connect the first energy storage module with the second energy storage module in series, and then connect said at least one energy storage module with the target system, and
   when the electric energy needs to be output with the third predetermined voltage, the first option switch is configured to connect the first energy storage module with both the second and the third energy storage module in series, and then connect said at least one energy storage module with the target system.

4. The power supply device according to claim 1, further comprising an instruction input circuit, and the instruction input circuit is configured to output an instruction to the first controller, wherein the first controller is configured to control the first option switch based on the instruction in order to provide the first predetermined voltage output or the second predetermined voltage output.

5. The power supply device according to claim 1, further comprising a charging circuit, a second controller, and a second option switch, wherein
   the second controller is configured to generate a charging control signal to be sent to the second option switch;
   the second option switch is configured to establish an electric connection between the charging circuit and the first or the second energy storage module based on the charging control signal; and
   the charging circuit is configured to charge the first energy storage module alone or to charge both the first and the second energy storage module simultaneously, based on the connection between the second option switch and the first or the second energy storage module.

6. The power supply device according to claim 5, wherein the charging circuit comprises a voltage detection circuit, an external charging power supply, and a buck-boost circuit, and
   the voltage detection circuit is used to detect the voltage of the first energy storage module, the second energy storage module, the input terminal of the charging circuit, or the output terminal of the charging circuit;
   the buck-boost circuit is configured to boost the output voltage of the external charging power supply when the charging voltage needs to be raised, and to lower the output voltage of the external charging power supply when the charging voltage needs to be lowered, on the basis of the detection of the voltage detection circuit.

7. The power supply device according to claim 6, wherein the buck-boost circuit comprises a capacitor, a triode, a diode, and an inductance.

8. The power supply device according to claims 1, wherein the first or the second energy storage module consists of a plurality of capacitors in series or a plurality of batteries in series.

9. The power supply device according to claim 8, wherein the battery is selected from a group consisting of a lithium cobalt oxide battery, a lithium manganate battery, a lithium iron phosphate battery, a lithium titanate battery, a ternary material lithium-ion battery, or a lead-acid battery.

10. The power supply device according to claim 8, wherein the capacitor is selected from a group consisting of a super capacitor, a lithium-ion capacitor, a hybrid capacitor, or a farad capacitor.

11. The power supply device according to claim 8, wherein the first energy storage module consists of three or four 3.7V/3.8V or 3.2 V batteries in series, and the second energy storage module consists of three or four 3.7V/3.8V or 3.2V batteries in series.

12. The power supply device according to claim 8, wherein the first energy storage module consists of five or six 2.4V lithium titanate batteries in series, and the second energy storage module consists of five or six 2.4V lithium titanate batteries in series.

13. The power supply device according to claim 8, wherein the first energy storage module is comprised with three to five capacitors in series, and the second energy storage module is comprised with three to five capacitors in series.

14. The power supply device according to claim 1, wherein the power supply device is a portable power supply device.

15. The power supply device according to claim 1, wherein the target system is a car system.

16. A power supply method for providing electric energy to a target system, comprises:
   by a first controller, receiving an external signal or instruction and generating a power supply control signal based on the external signal or instruction; and
   by a first option switch, receiving the power supply control signal and establishing a connection between at least one energy storage module and the target system based on the power supply control signal in order to selectively output electric energy to the target system with one or more predetermined voltages;
   wherein when the electric energy needs to be output with a first predetermined voltage, connecting a first energy storage module of the at least one energy storage module with the target system;
   wherein the power supply method further comprises:
   by the first option switch, establishing a connection between a first, a second energy storage modules and the target system based on the power supply control signal in order to selectively output electric energy to the target system with a first predetermined voltage or a second predetermined voltage;
   wherein when the electric energy needs to be output with the first predetermined voltage, by the first option switch, connecting only the first energy storage module with the target system, and
   when the electric energy needs to be output with the second predetermined voltage, by the first option switch, connecting the first energy storage module with the second energy storage module in series, and then connecting said at least one energy storage module with the target system;
   wherein the power supply method further comprises:
   by a voltage detection circuit, detecting a desired charging voltage of the target system and outputting a voltage detection signal;
   by the first controller, identifying the desired charging voltage of the target system based on the voltage detection signal and controlling the first option switch to provide the first predetermined voltage output or the second predetermined voltage output.

17. The power supply method according to claim 16, further comprising:
   by a second controller, generating a charging control signal to be sent to a second option switch;
   by the second option switch, selectively establishing an electric connection between an charging circuit and the first or the second energy storage module based on the charging control signal; and
   by the charging circuit, charging the first energy storage module alone or charging both the first and the second energy storage module simultaneously, based on the connection between the second option switch and the first or the second energy storage module.

* * * * *